United States Patent Office 2,862,955
Patented Dec. 2, 1958

2,862,955

ESTERS OF HYDROXYACYL-9-OXODEHYDRO-ABIETIC ACID

Willard M. Hoehn, Wilmette, Ill., assignor to G. D. Searle & Co., Chicago, Ill., a corporation of Illinois No Drawing. Application August 17, 1955
Serial No. 529,084

8 Claims. (Cl. 260—468.5)

The present invention relates to a new class of derivatives of dehydroabietic acid, and is specifically concerned with hydroxyacyl and acyloxyacyl substitution products of the lower alkyl esters of 9-oxodehydroabietic acid. The compounds of this invention can be represented by the structural formula

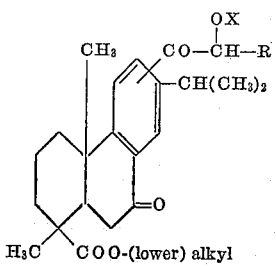

wherein R is a member of the group consisting of hydrogen and lower alkyl radicals and X is a member of the group consisting of hydrogen and acyl radicals derived from carboxylic acids having fewer than 9 carbon atoms. When R is a lower alkyl radical in the foregoing structural formula, it can represent methyl, ethyl, propyl, butyl, amyl, hexyl, heptyl, octyl, and branched-chain isomers thereof. When X is an acyl radical in the foregoing structural formula, it can represent such alkanoyl groups as formyl, acetyl, propionyl, butyryl, valeryl, hexanoyl, heptanoyl, octanoyl, and branched-chain isomers thereof, the aforementioned alkanoyl radicals all being the acyl radicals derived from lower alkanoic acids. Also, X can represent an acyl radical derived from cyclic hydrocarbon carboxylic acids having fewer than 9 carbon atoms, and it can therefore represent such acyl radicals as benzoyl, toluoyl, phenylacetyl, cyclohexaneacetyl, and cyclopentanepropionyl. Because the precise nature of this acyl radical is not a critical feature of this invention, and need be selected only in such a manner that the resulting composition possesses a toxicity sufficiently low for successful incorporation into a pharmaceutical formulation, other acyl radicals, representatively salicyloyl, are also suitable acyl radicals and are included within the scope encompassed by the term X.

Satisfactory starting materials for the manufacture of the compounds of this invention are the lower alkyl esters of dehydroabietic acid, some of which are disclosed in U. S. 2,201,237 to Littmann, and elsewhere. These lower alkyl esters of dehydroabietic acid undergo Friedel-Crafts reactions with acyl halides to yield acyl substitution products, predominantly the 6-acyl derivatives, with lesser amounts of the 8-acyl derivatives and trace amounts of the 5-acyl derivatives. Halogenation of such an acyl substitution product leads predominantly to the introduction of a halogen atom in the acyl substituent at the position alpha to the carbonyl group, and subsequent oxidation of the haloacyl derivatives with chromium trioxide results in the introduction of an oxo group at position 9. Illustratively, the aluminum chloride-catalyzed reaction of methyl dehydroabietate with acetyl chloride and separation of the predominant isomer, followed by bromination and oxidation with chromium trioxide, result in the formation of methyl 6-bromoacetyl-9-oxodehydroabietate having the structural formula

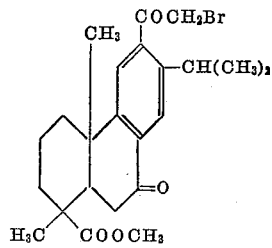

Reaction of the alkyl ester of the α-haloacyl-9-oxodehydroabietic acid with an alkali metal acylate then yields the desired acyloxyacyl derivative. For example, reaction of the bromoacetyl compound of the foregoing structural formula with sodium acetate or potassium acetate, desirably in solution in aqueous ethanol to which sufficient acetic acid has been added to make the entire solution barely acidic, results in the formation of methyl 6-acetoxyacetyl-9-oxodehydroabietate having the following structural formula

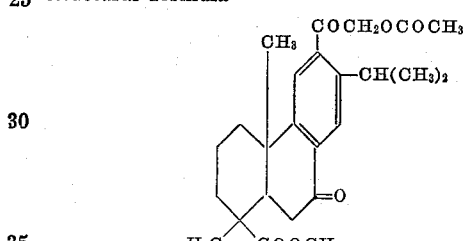

Numerous changes can be made in the sequence of chemical steps described hereinbefore without departing from the scope of this invention. Thus, while the illustrated sequence of steps was Friedel-Crafts substitution followed by halogenation, followed by oxidation, followed by condensation with an alkali metal acylate, other sequences of these steps are operative and are considered equivalent for the purposes of this invention. For example, the oxidation step may come after rather than before the step involving condensation with an alkali metal acylate, or the halogenation step can come after rather than before the oxidation step.

An additional modification of this process is achieved by conducting a Friedel-Crafts reaction of a lower alkyl ester of dehydroabietic acid with a haloalkanoyl halide such as chloroacetyl chloride, bromoacetyl bromide, α-bromopropionyl bromide, or α-bromobutyryl bromide, whereby the haloacyl derivatives result directly in a single step and the necessity for subsequent halogenation is eliminated. The hydroxyacyl derivatives of this invention are conveniently prepared by alkaline hydrolysis of the corresponding acyloxyacyl derivatives. Because of the relative unreactivity of the sterically-hindered carboxylic acid ester grouping at position 1 in these compounds, an alkaline hydrolysis carried out for a short period of time at room temperature or at a moderately elevated temperature does not attack this grouping to a significant extent.

The acyloxyacyl derivatives of this invention are also available by an alternative route which avoids the α-haloacyl type of intermediate. A typical embodiment of this route comprises the steps of forming a lower alkyl ester of 6-acetyldehydroabietic acid by conducting an aluminum chloride-catalyzed reaction of a lower alkyl ester of dehydroabietic acid and acetyl chloride and separating the predominant isomer, condensing it with an aromatic aldehyde such as benzaldehyde whereby the acetyl group is transformed into an arylideneacetyl group, protecting the ketonic carbonyl by such means as ketal formation with ethylene glycol, and ozonizing to an aldehyde having the following structural formula

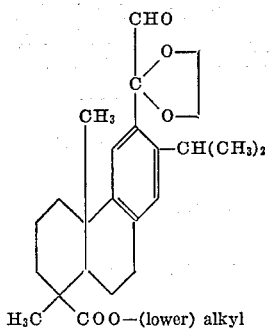

Reduction with sodium borohydride at room temperature for a reaction time of about 30 minutes and acidic cleavage of the ketal yields a lower alkyl ester of 6-hydroxyacetyldehydroabietic acid. Esterification of this compound in pyridine solution with an acid chloride or acid anhydride, followed by introduction of a 9-oxo group by oxidation with chromium trioxide yields a lower alkyl ester of 6-acyloxyacetyl-9-oxodehydroabietic acid.

The new compositions described herein are valuable in chemotherapeutics. The claimed acyloxyacyl and hydroxyacyl substitution products of the lower alkyl esters of 9-oxodehydroabietic acid are potent hypotensive agents and are capable of reducing abnormally elevated blood pressure for relatively prolonged periods of time after their administration.

This invention will appear more fully from the following examples. It will be understood, however, that these examples are set forth by way of illustration only and that the invention is not to be construed as limited in spirit or in in scope by the details contained therein. It will be apparent to those skilled in the art that many modifications in materials and methods can be made without departing from the scope of the invention. In these examples temperatures are given in degrees centigrade (°C.), quantities of materials in parts by weight, and pressures in millimeters (mm.) of mercury.

*Example 1*

To a solution of 71 parts of methyl 6-acetyldehydroabietate in 350 parts of ether there is added a trace of aluminum chloride and then, over a period of about 5 minutes, 32 parts of bromine. The mixture is stirred during the period of addition and for an additional 10 minutes, after which it is poured into 1000 parts of warm water at such a rate that the ether is vaporized about as rapidly as the reaction mixture is added. The crude product which separates as the ether vaporizes is collected, covered with 400 parts of ethanol and allowed to stand for several hours. The solid product is collected on a filter and washed with ethanol. The melting point is about 112–114° C. If a more highly purified product is desired, this material is recrystallized repeatedly from methanol and from mixtures of methanol and chloroform until the melting point is approximately 121–123° C. This compound, methyl 6-bromoacetyldehydroabietate, has the following structural formula

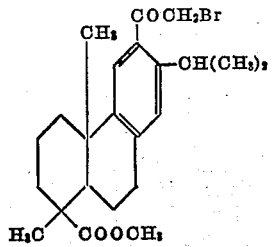

*Example 2*

A solution of 23 parts of bromine in 125 parts of dimethylformamide is mixed with a solution of 51 parts of methyl 6-acetyldehydroabietate in 175 parts of dimethylformamide, and the reaction mixture is stirred for 2 hours and then allowed to stand at room temperature for 2–3 days. The mixture is then diluted with 300 parts of water, with constant stirring, and the crystalline precipitate is then collected on a filter and washed with water. When this crude product is digested with methanol and then recrystallized several times from mixtures of chloroform and methanol, there is obtained purified methyl 6-bromoacetyldehydroabietate, identical with the product of Example 1.

*Example 3*

A stirred mixture of 100 parts of methyl dehydroabietate, 64 parts of bromoacetyl bromide and 360 parts of nitrobenzene is maintained between about 0° and 3° C. while 85 parts of aluminum chloride is added in small portions over a period of 40 minutes. The reaction mixture is maintained at about 5° C. for 2 to 3 days and is then poured onto 500 parts of ice and 60 parts of concentrated hydrochloric acid. When the ice has melted, 700 parts of ether are added. The organic phase is washed with several portions of water, with 0.4% sodium hydroxide solution and again with several portions of water. The organic layer is then separated, dried over sodium sulfate, filtered and concentrated in a vacuum until the ether and nitrobenzene are removed. The residual black gum is decolorized in ether solution with actived charcoal. Repeated recrystallization from mixtures of methanol and chloroform yields purified methyl 6-bromoacetyldehydroabietate, identical with the product of Example 1.

*Example 4*

A solution of 200 parts of methyl dehydroabietate, 720 parts of nitrobenzene and 79.5 parts of chloroacetyl chloride is cooled to about 0–5° C. and, with constant stirring, treated with a total of 170 parts of aluminum chloride added in small portions. The reaction mixture is maintained at about 5° C. for 48 hours and is then poured onto 1000 parts of ice. The aqueous layer is tested with indicator paper in order to make certain that the pH is no higher than 2. Ether (1400 parts) is added and the organic phase is washed with several portions of cold water, dried over anhydrous calcium sulfate and filtered. The ether and nitrobenzene are removed from the filtrate by distillation under reduced pressure, and the gummy residue is recrystallized several times from methanol to give purified methyl 6-chloroacetyldehydroabietate melting at 119–120° C. and having the following structural formula

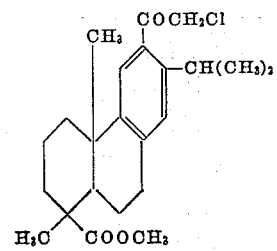

When the cyrstallization liquors are combined, decolorized with activated charcoal and concentrated, there is obtained the isomeric methyl 8-chloroacetyldehydroabietate. After recrystallization from methanol this compound melts at about 91–93° C. It has the following structural formula

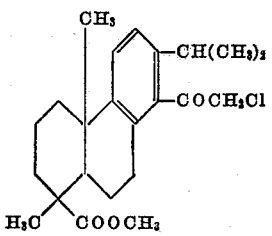

Example 5

A mixture of 13 parts of methyl 6-chloroacetyldehydroabietate, 60 parts of acetone and 13 parts of sodium iodide is shaken well and then allowed to stand for 20 hours at room temperature. The reaction mixture is then partitioned with the use of 320 parts of ether and an additional 250 parts of water. The ethereal layer is washed with 2 portions of 1% sodium thiosulfate solution and with several portions of water. It is then dried over anhydrous sodium sulfate, filtered and concentrated to about 10% of its original volume. When 160 parts of methanol are added a crystalline precipitate forms and is collected on a filter. Additional product is obtained by concentration of the filtrate. This compound is methyl 6-iodoacetyldehydroabietate. It melts at about 129–130° C. and has the following structural formula

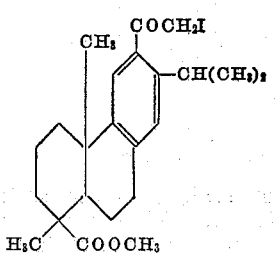

Mixtures of this compound with methyl 6-acetyldehydroabietate and with methyl 6-chloroacetyldehydroabietate exhibit pronounced depressions of the melting points.

The reaction between methyl 8-chloroacetyldehydroabietate and sodium iodide, conducted in the identical manner, gives methyl 8-iodoacetyldehydroabietate of the following structural formula

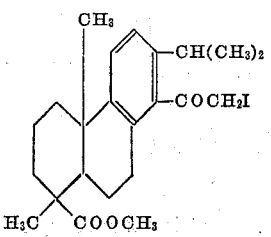

Example 6

Methyl 8-acetyldehydroabietate (19 parts), prepared by the method of Fieser and Campbell, J. Am. Chem. Soc., vol. 61, page 2528 (1939), is dissolved in 100 parts of dimethylformamide. There is then added a solution of 8.6 parts of bromine in 45 parts of dimethylformamide. This reaction mixture is stirred for 2 hours and then allowed to stand at room temperature for 4 days, at the end of which time it is poured, with stirring, into 200 parts of water. The precipitate which forms is collected on a filter and washed with water. After repeated recrystallizations from methanol there is obtained purified methyl 8-bromoacetyldehydroabietate having the following structural formula

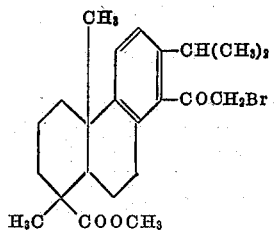

Example 7

A solution of 10 parts of methyl 6-chloroacetyldehydroabietate in 105 parts of acetic acid is treated by the addition of a solution of 4 parts of chromium trioxide in 125 parts of 90% acetic acid and the mixture is allowed to stand for about 1 hour. The reaction is slightly exothermic, and external cooling is applied, if necessary, to keep the reaction temperature at about 30° C. or lower. The crystalline precipitate which separates is collected on a filter and washed with water. An additional quantity of this crude product is obtained by diluting the filtrate with about 250 parts of water and collecting the precipitate on a filter. Purification of the combined crude product by recrystallization from a mixture of chloroform and methanol yields methyl 6-chloroacetyl-9-oxodehydroabietate melting at 180–182° C. This compound has the structural formula

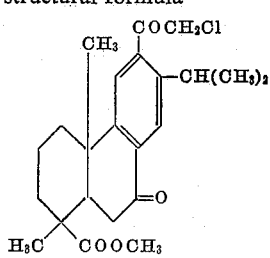

Oxidations of methyl 6-bromoacetyldehydroabietate and methyl 6-iodoacetyldehydroabietate with chromium trioxide in the same manner result in the formation of the corresponding 9-oxo derivatives.

Example 8

A mixture of 9.1 parts of methyl 6-chloroacetyl-9-oxodehydroabietate, 8.1 parts of sodium acetate, 12 parts of water, 60 parts of ethanol and 1.5 parts of acetic acid is heated under reflux for 4 hours. The mixture is poured into 350 parts of water, and the precipitated gummy product is washed by decantation with several portions of water and crystallized by stirring it with methanol. Purification by recrystallization from a mixture of ether and methanol affords methyl 6-acetoxyacetyl-9-oxodehydroabietate melting at 146–148° C. This compound has the structural formula

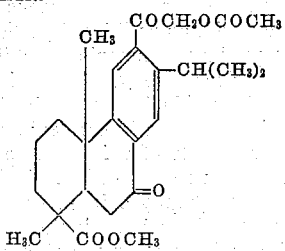

The same compound is obtained by substitution of an equivalent amount of methyl 6-bromoacetyl-9-oxodehydroabietate or methyl 6-iodoacetyl-9-oxodehydroabietate for the methyl 6-chloroacetyl-9-oxodehydroabietate in this reaction.

Example 9

By the procedure of Example 8, with the substitution of 9.5 parts of sodium propionate for the sodium acetate, and with the substitution of 1.8 parts of propionic acid for the acetic acid, there is obtained methyl 6-propionoxyacetyl-9-oxodehydroabietate.

*Example 10*

By the procedure of Example 8, with the substitution of 16 parts of the sodium salt of cyclohexaneacetic acid for the sodium acetate, and with the substitution of 3.7 parts of cyclohexaneacetic acid for the acetic acid, there is obtained methyl 6-cyclohexaneacetoxyacetyl-9-oxodehydroabietate.

*Example 11*

A mixture of 8.1 parts of methyl 6-chloroacetyl-9-oxodehydroabietate, 8.1 parts of sodium salicylate, 60 parts of ethanol, 10 parts of water and 1 part of acetic acid is heated under reflux for 4 hours. The reaction mixture is then poured into 400 parts of water, and the insoluble gummy product is washed by decantation with several portions of water and is then crystallized by stirring it with ethanol. Purification by recrystallization from a mixture of chloroform and methanol affords methyl 6-salicyloyloxyacetyl-9-oxodehydroabietate, melting at 123–125° C. This compound has the structural formula

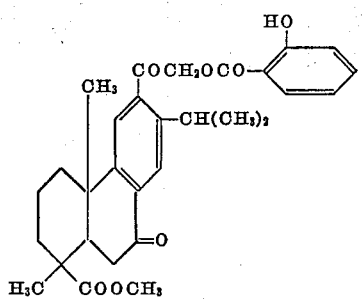

*Example 12*

By the procedure of Example 11, with the substitution of 7.2 parts of sodium benzoate for the sodium salicylate, there is obtained methyl 6-benzoyloxyacetyl-9-oxodehydroabietate.

*Example 13*

Two parts of methyl 6-acetoxyacetyl-9-oxodehydroabietate is mixed with a solution of 0.3 part of potassium hydroxide in 32 parts of methanol. The mixture is warmed slightly to bring about complete solution and is stirred for about 4 minutes. Water (0.01 part) in methanol (1.6 parts) is added, and after an additional minute, a solution of 0.32 part of acetic acid in 1.6 parts of methanol is added. The mixture is then partitioned into phases by shaking it with 50 parts of water and 35 parts of ether. The aqueous layer is separated and extracted with an additional portion of 35 parts of ether, and the combined ethereal extract is washed with 2% sodium hydroxide solution and then with several portions of water. The residual gum obtained by vaporization of the ether is washed with petroleum ether and then dissolved in about 8 parts of a 50 volume percent solution of benzene in petroleum ether. This solution is poured on a chromatography column prepared from 84 parts of silica gel, and the column is eluted with mixtures of benzene and petroleum ether containing gradually increasing proportions of benzene, with benzene, and with mixtures of ethyl acetate and benzene containing gradually increasing proportions of ethyl acetate. The fractions obtained by elution of the column with a 10 volume percent solution of ethyl acetate in benzene afford methyl 6-hydroxyacetyl-9-oxodehydroabietate, which is purified by evaporative distillation at a pressure of about 0.3 mm. and a bath temperature of 240–250° C. This compound has infrared absorption maxima at 2.82, 5.82, 5.93, 6.25, 7.01, 7.98, 8.45, 9.40 and 9.56 microns. It has the structural formula

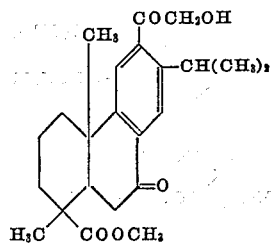

*Example 14*

A solution of 7.8 parts of methyl 8-chloroacetyldehydroabietate in 55 parts of acetic acid is stirred with a solution of 4 parts of chromium trioxide in 125 parts of 90% acetic acid, and the mixture is allowed to stand at room temperature for about 18 hours. The crystalline material which separates is collected on a filter and washed with water. An additional quantity of crude product is obtained by diluting the filtrate with 200 parts of water. Purification of the combined crude product by recrystallization from methanol or from a mixture of chloroform and methanol yields methyl 8-chloroacetyl-9-oxodehydroabietate melting at 189–190° C. This compound has the structural formula

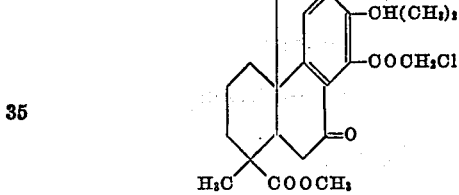

Oxidations of methyl 8-bromoacetyldehydroabietate and methyl 8-iodoacetyldehydroabietate with chromium trioxide in the same manner result in the formation of the corresponding 9-oxo derivatives.

*Example 15*

By the procedure of Example 8, with the substitution of methyl 8-chloroacetyl-9-oxodehydroabietate for methyl 6-chloroacetyl-9-oxodehydroabietate, there is obtained methyl 8-acetoxyacetyl-9-oxodehydroabietate. This compound has the structural formula

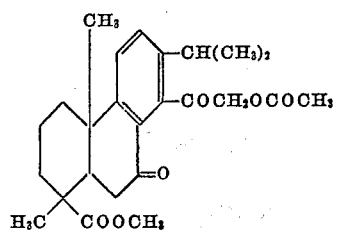

The same compound is obtained by substitution of an equivalent amount of methyl 8-bromoacetyl-9-oxodehydroabietate or methyl 8-iodoacetyl-9-oxodehydroabietate for the methyl 8-chloroacetyl-9-oxodehydroabietate in this reaction.

*Example 16*

By the procedure of Example 13, with the substitution of methyl 8-acetoxyacetyl-9-oxodehydroabietate for methyl 6-acetoxyacetyl-9-oxodehydroabietate, there is obtained methyl 8-hydroxyacetyl-9-oxodehydroabietate.

*Example 17*

To a stirred solution of 100 parts of ethyl dehydroabietate, 390 parts of nitrobenzene, and 33 parts of butyryl chloride, maintained at about 0–5° C., 85 parts of aluminum chloride is added. The reaction mixture is maintained under refrigeration at about 5° C. for 72 hours, after which it is poured onto ice. The aqueous layer is tested with indicator paper to make certain that it is distinctly acidic. Ether is then added, with stirring, until the specific gravity of the organic layer is such that it rises above the aqueous layer. The organic phase is washed with dilute sodium hydroxide solution and with several portions of water, dried over sodium sulfate, and filtered. The ether and most of the nitrobenzene are removed by distillation of the filtrate, first at atmospheric pressure and then at a pressure of about 15 mm. When the residue is subjected to a vacuum distillation at a pressure of about 0.03 mm., the mixture of the butyryl derivatives of ethyl dehydroabietate is collected as a very viscous oil at a bath temperature of about 200–205° C. The principal component of this distillate, ethyl 6-butyryldehydroabietate, is obtained in purified form by crystallization from ether or from methanol. This compound has the following structural formula

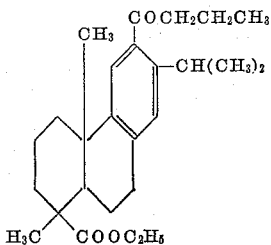

The corresponding 8-butyryl derivative is obtained by subjecting the residues from the crystallization liquors to chromatographic fractionation.

*Example 18*

A solution of 16 parts of bromine in 85 parts of dimethylformamide is mixed with a solution of 40 parts of ethyl 6-butyryldehydroabietate in 175 parts of dimethylformamide, and the reaction mixture is stirred for 2 hours and then allowed to stand at room temperature for 2–3 days. The mixture is then diluted with 300 parts of water, and the precipitated product is collected on a filter and washed with water. By recrystallization of this crude product from methanol, there is obtained purified ethyl 6-(α-bromobutyryl)dehydroabietate having the following structural formula

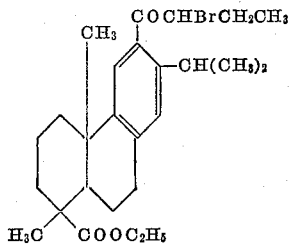

*Example 19*

A solution of 15 parts of ethyl 6-(α-bromobutyryl)dehydroabietate in 210 parts of acetic acid is treated by the addition of a solution of 4.9 parts of chromium trioxide in 155 parts of 90% acetic acid and the mixture is allowed to stand for about 1 hour. The reaction is slightly exothermic, and external cooling is applied, if necessary, to keep the reaction temperature at about 30° C. or lower. The reaction mixture is then diluted with about 400 parts of water and the insoluble product is collected on a filter. Purification by recrystallization from a mixture of chloroform and methanol yields ethyl 6-(α-bromobutyryl)-9-oxodehydroabietate having the structural formula

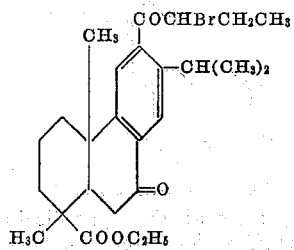

*Example 20*

A mixture of 12 parts of ethyl 6-(α-bromobutyryl)-9-oxodehydroabietate, 9.6 parts of potassium acetate, 15 parts of water, 80 parts of ethanol, and 1.5 parts of acetic acid is heated under reflux for 4 hours. The mixture is poured into 400 parts of water, and the precipitated gummy product is washed by decantation with several portions of water. The gummy product is crystallized by stirring it with methanol. Recrystallization from a mixture of ether and methanol yields ethyl 6-(α-acetoxybutyryl)-9-oxodehydroabietate having the structural formula

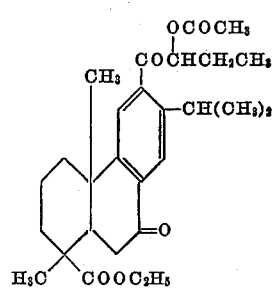

*Example 21*

By the procedure of Example 17, with the substitution of 28.5 parts of propionyl chloride for the butyryl chloride, there is obtained ethyl 6-propionyldehydroabietate. With this intermediate, the sequence of steps consisting of a bromination by the method of Example 18, an oxidation by the method of Example 19, and a reaction with potassium acetate by the method of Example 20 yields ethyl 6-(α-acetoxypropionyl)-9-oxodehydroabietate.

What is claimed is:

1. A compound having the structural formula

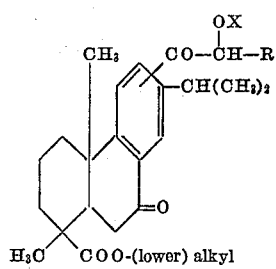

wherein R is a member of the group consisting of hydrogen and lower alkyl radicals; X is a member of the group consisting of hydrogen, the acyl radicals of hydrocarbon carboxylic acids having fewer than 9 carbon atoms, and the salicyloyl radicals; and wherein the group

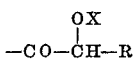

is attached to one of the positions 6 and 8.

2. A compound having the structural formula

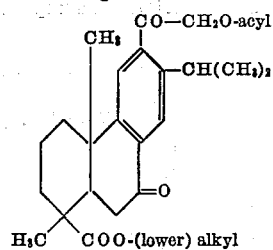

wherein the acyl radical is the acyl radical of a hydrocarbon carboxylic acid having fewer than 9 carbon atoms.

3. Methyl 6-acetoxyacetyl-9-oxodehydroabietate.
4. Methyl 6-salicyloyloxyacetyl-9-oxodehydroabietate.
5. Methyl 6-hydroxyacetyl-9-oxodehydroabietate.
6. A compound having the structural formula

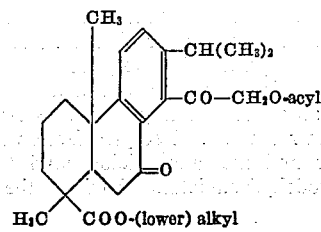

wherein the acyl radical is the acyl radical of a hydrocarbon carboxylic acid having fewer than 9 carbon atoms.

7. Methyl 8-acetoxyacetyl-9-oxodehydroabietate.
8. Methyl 8-hydroxyacetyl-9-oxodehydroabietate.

References Cited in the file of this patent
UNITED STATES PATENTS

| | | |
|---|---|---|
| 2,656,345 | Jacobson | Oct. 20, 1953 |
| 2,705,725 | Bible et al. | Apr. 5, 1955 |
| 2,759,014 | Bible | Aug. 14, 1956 |
| 2,767,162 | Picha | Oct. 16, 1956 |
| 2,774,784 | Picha | Dec. 18, 1956 |

OTHER REFERENCES

J. A. C. S. 60, 2631 (1938).
J. A. C. S. 61, 2532 (1939).
J. A. C. S. 73, 3803 (1951).